United States Patent
Wachsman et al.

(10) Patent No.: US 10,256,504 B2
(45) Date of Patent: Apr. 9, 2019

(54) IONIC CONDUCTIVITY OF NASICON THROUGH ALIOVALENT CATION SUBSTITUTION

(71) Applicant: University of Maryland, College Park, College Park, MD (US)

(72) Inventors: Eric D. Wachsman, Fulton, MD (US); Adam Jolley, College Park, MD (US)

(73) Assignee: University of Maryland, College Park, MD (US)

(*) Notice: Subject to any disclaimer, the term of this patent is extended or adjusted under 35 U.S.C. 154(b) by 0 days.

(21) Appl. No.: 15/065,560

(22) Filed: Mar. 9, 2016

(65) Prior Publication Data
US 2016/0268631 A1  Sep. 15, 2016

Related U.S. Application Data

(60) Provisional application No. 62/130,082, filed on Mar. 9, 2015.

(51) Int. Cl.
| | |
|---|---|
| *H01M 10/0562* | (2010.01) |
| *H01M 10/0561* | (2010.01) |
| *H01M 10/056* | (2010.01) |
| *H01M 10/054* | (2010.01) |
| *H01M 10/0585* | (2010.01) |

(52) U.S. Cl.
CPC ..... *H01M 10/0562* (2013.01); *H01M 10/054* (2013.01); *H01M 10/0585* (2013.01); *H01M 2300/0068* (2013.01)

(58) Field of Classification Search
None
See application file for complete search history.

(56) References Cited

PUBLICATIONS

Bukun et al, The Effect of Ion Substitution in Sodium-Conducting Solid Electrolytes on the Reversibility of the Electrode-Solid Electrolyte Interface, 86-88 Solid State Ionics 107-111 (1996).*
Takahashi et al, Solid-State Ionics—Conductivities of Na+ Ion Conductors Based on NASICON, 1:3-4 Solid State Ionics, 163-175 (1980).*
Arora, P., et al., "Capacity Fade Mechanisms and Side Reactions in Lithium-Ion Batteries," *J. Electrochem. Soc.* 145(10):3647-3667, The Electrochemical Society, Inc., United States (1998).
Bates, J.B., et al., "5 Volt Plateau in LiMn$_2$O$_4$ Thin Films," *J. Electrochem. Soc.* 142(9):L149-L151, The Electrochemical Society, Inc., United States (1995).
Boilot, J.P., et al., "Relation Structure-Fast Ion Conduction in the NASICON Solid Solution," *Journal of Solid State Chemistry* 73:160-171, Academic Press, Inc., United States (1988).

(Continued)

*Primary Examiner* — Yoshitoshi Takeuchi
(74) *Attorney, Agent, or Firm* — Sterne, Kessler, Goldstein & Fox P.L.L.C.

(57) ABSTRACT

The present invention is directed to solid NASICON electrolytes in which the zirconium site is doped with a 2+ oxidation state cation. The present invention is also directed to methods of making the solid electrolytes and methods of using the solid electrolytes in batteries and other electrochemical technologies.

20 Claims, 13 Drawing Sheets

(56) References Cited

PUBLICATIONS

Blyr, A., et al., "Self-Discharge of LiMn$_2$O$_4$/C Li-Ion Cells in Their Discharged State Understanding by Means of Three-Electrode Measurements," *J. Electrochem. Soc.* 145(1):194-209, The Electrochemical Society, Inc., United States (1998).

Bukun, N.G., "Superionic Transitions in NASICON-Type Solid Electrolytes," *Ionics* 2:63-68, Springer Berlin Heidelberg, Germany (1996).

Ciesla, J.J., "Safety Considerations for Fabricating Lithium Battery Packs," *Journal of Power Sources* 18:101-107, Elsevier Sequoia, Netherlands (1986).

Cvjetićanin, N.D. and Mentus, S., "Conductivity, viscosity and IR spectra of Li, Na and Mg perchlorate solutions in propylene carbonate/water mixed solvents," *Phys. Chem. Chem. Phys.* 1:5157-5161, Royal Society of Chemistry, United Kingdom. (1999).

Feist, T., et al., "The Energetics of Phase Transitions in the System Na$_{1+x}$Zr$_2$Si$_x$P$_{3-x}$O$_{12}$, 1.9≤X≤2.5," *Thermochimica Acta* 106:57-61, Elsevier Science Publishers B.V., Netherlands (1986).

Feltz, A. and Barth, S., "Preparation and Conductivity Behavior of Na$_{3M}{}^{II}$Zr(PO$_4$)$_3$, (M$^{II}$: Mn, Mg, Zn)," *Solid States Ionics* 9&10:817-822, North-Holland Publishing Company, Netherlands (1983).

Fergus, J.W., "Ion transport in sodium ion conducting solid electrolytes," *Solid State Ionics* 227:102-112, Elsevier B.V., Netherlands (2012).

Fuentes, R.O., et al., "Processing and electrical properties of NASICON prepared from yttria-doped zirconia precursors," *Journal of the European Ceramic Society* 21:737-743, Elsevier Science Ltd., England (2001).

Goodenough, J.B., et al., "Fast Na$^+$-Ion Transport in Skeleton Structures," *Mat. Res. Bull.* 11:203-220, Pergamon Press, Inc., England (1976).

Hayaski, A., et al., "Superionic glass-ceramic electrolytes for room-temperature rechargeable sodium batteries," *Nature Communications* 3:856, 5 pages, Macmillan Publishers Limited, England (2012).

Hong, H.Y-P., "Crystal Structures and Crystal Chemistry in the System Na$_{1+x}$Zr$_2$Si$_x$P$_{3-x}$O$_{12}$," *Mat. Res. Bull* 11:173-182, Pergamon Press, Inc., England (1976).

Hyung, Y.E., et al., "Flame-retardant additives for lithium-ion batteries," *Journal of Power Sources* 119-121:383-387, Elsevier Science B.V., Netherlands (2003).

Jolley, A.G., et al., "Structural Investigation of Monoclinic-Rhombohedral Phase Transition in Na$_3$Zr$_2$Si$_2$PO$_{12}$ and Doped NASICON," *J. Am. Ceram. Soc.* 98(9):2902-2907, The American Ceramic Society, United States (2015).

*The Trouble with Lithium 2 Under the Microscope*, Meridian International Research, France, May 29, 2008, 58 pages.

Miyajima, Y., et al., "Ionic conductivity of NASICON-type Na$_{1+x}$M$_x$Zr$_{2-x}$P$_3$O$_{12}$ (M: Yb, Er, Dy)," *Solid State Ionics* 84:61-64, Elsevier Science B.V., Netherlands (1996).

Miyajima, Y., et al., "Solubility range and ionic conductivity of large trivalent ion doped Na$_{1+x}$M$_x$Zr$_{2-x}$P$_3$O$_{12}$ (M: In, Yb, Er, Y, Dy, Tb, Gd) solid electrolytes," *Solid States Ionics* 124:201-211, Elsevier Science B.V., Netherlands (1999).

Plichta, E.J. and Behl, W.K., "A low-temperature electrolyte for lithium and lithium-ion batteries," *Journal of Power Sources* 88:192-196, Elsevier Science S.A., Switzerland (2000).

Saito, Y., et al., "Ionic conductivity on NASICON-type conductors Na$_{1.5}$M$_{0.5}$Zr$_{1.5}$(PO$_4$)$_3$ (M:Al$^{3+}$, Ga$^{3+}$, Cr$^{3+}$, Sc$^{3+}$, Fe$^{3+}$, In$^{3+}$, Yb$^{3+}$, Y$^{3+}$)," *Solid State Ionics* 58:327-331, Elsevier Science Publishers B.V., Netherlands (1992).

Shin, Y. and Manthiram, A., "Influence of the Lattice Parameter Difference between the Two Cubic Phases Formed in the 4 V Region on the Capacity Fading of Spinel Manganese Oxides," *Chem. Mater.* 15:2954-2961, American Chemical Society, United States (2003).

Smart, M.C., et al., "Irreversible Capacities of Graphite in Low-Temperature Electrolytes for Lithium-Ion Batteries," *Journal of The Electrochemical Society* 146(11):3963-3969, The Electrochemical Society, Inc., United States (1999).

Takahashi, T., et al., "Solid-State Ionics—Conductivities of Na$^+$Ion Conductors Based on NASICON," *Solid State Ionics* 1:163-175, North-Holland Publishing Company, Netherlands (1980).

Von Alpen, U., et al., "Phase Transition in NASICON (Na$_3$Zr$_2$Si$_2$PO$_{12}$)," *Mat. Res. Bull.* 14:1317-1322, Pergamon Press Ltd., England (1979).

Wang, Q., et al., "4-Isopropyl Phenyl Diphenyl Phosphate as Flame-Retardant Additive for Lithium-Ion Battery Electrolyte," *Electrochemical and Solid-State Letters* 8(9):A467-A470, The Electrochemical Society, Inc., United States (2005).

Xiang, H.F., et al., "Dimethyl methylphosphonate (DMMP) as an efficient flame retardant additive for the lithium-ion battery electrolytes," *Journal of Power Sources* 173:562-564, Elsevier B.V., Netherlands (2007).

Xu, K., "Nonaqueous Liquid Electrolytes for Lithium-Based Rechargeable Batteries," *Chem. Rev.* 104:4303-4417, American Chemical Society, United States (2004).

\* cited by examiner

IONIC CONDUCTIVITY OF NASICON THROUGH ALIOVALENT CATION SUBSTITUTION

STATEMENT REGARDING FEDERALLY SPONSORED RESEARCH OR DEVELOPMENT

This invention was made with government support under DEAC0494AL850000 awarded by the Department of Energy. The government has certain rights to this invention.

BACKGROUND OF THE INVENTION

Field of the Invention

The present invention is directed to solid NASICON electrolytes in which the zirconium site is doped with a 2+ oxidation state cation. The present invention is also directed to methods of making the solid electrolytes and methods of using the solid electrolytes in batteries and other electrochemical technologies.

Background

The development of high capacity, high power, and low cost electrochemical batteries will help to catalyze the coming energy revolution. For example, inconsistent production of energy could be averaged over several days or weeks with large, inexpensive batteries. And, vehicles could run on electric motors powered by energy dense batteries, ultimately drawing their power from the electric grid.

Lithium-ion batteries are some of the best performing and most prevalent batteries today. Unfortunately, they bring with them a host of problems, most notably a limited supply and the high cost of lithium. See "The Trouble with Lithium 2: Under the Microscope," Meridian International Research 2008. Current lithium-ion batteries also entail short cycle-life and dangerous overheating scenarios. See J. J. Ciesla, *J. Power Sources* 18:101-107 (1986). Moreover, conventional lithium-ion batteries suffer drawbacks due to their organic liquid electrolyte, including dissolution of electrodes into the electrolyte and development of a "solid-electrolyte interface" (SEI), which decreases round trip efficiency and greatly shortens cycle life. See Arora, P., et al., *J. Electrochemical Soc.* 145:3647-3667 (1998); Smart, M. C., et al., *J. Electrochemical Soc.* 146:3963-3969 (1999); Blyr, A., et al., *J. Electrochemical Soc.* 145:194-209 (1998); and Y. Shin and A. Manthiram, *Chem. of Materials* 15:2954-2961 (2003). Further, the breakdown voltage of liquid electrolytes is only 4V, and liquid electrolytes have been shown to out-gas and explode, which limits the operating voltage and temperature of the battery. See M. Na, *Solid State Ionics* 124: 201-211 (1999); Y. Shin and A. Manthiram, *Chem. of Materials* 15:2954-2961 (2003); K. Xu, *Chem. Rev.* 104: 4303-4417 (2004); J. J. Ciesla, *J. Power Sources* 18:101-107 (1986); Wang, Q. S., et al., *Electrochemical and Solid State Letters* 8:A467-A470 (2005); Hyung, Y. E., et al., *J. Power Sources* 119:383-387 (2003); and Xiang, H. F., *J. Power Sources* 173:562-564 (2007).

All-solid-state sodium-ion batteries promise a cheap, safe alternative to current battery chemistries. Solid state ceramic electrolytes show no electrode dissolution or SEI formation, have been shown to be stable beyond 5V (see Hayashi, A., et al., *Nature Commun.* 3:856 (2012) and Bates, J. B., et al., *J. Electrochemical Soc.* 142:L149-L151 (1995)), and are safe to use at very high temperatures due to the intrinsic stability of ceramics. However, the room temperature conductivities of ceramic sodium electrolytes are usually several orders of magnitude lower than their organic counterparts. See J. W. Fergus, *Solid State Ionics* 227:102-112 (2012); E. J. Plichta and W. K. Behl, *J. Power Sources* 88:192-196 (2000); and N. D. Cvjeticanin and S. Mentus, *Phys. Chem. Chem. Phys.* 1:5157-5161 (1999).

If solid-state sodium-ion batteries are to be competitive, they must have high performance at room temperature and thus, be high conductivity solid electrolytes. Superionic NASICON ($Na^+$ Superionic Conductor), $Na_3Zr_2Si_2PO_{12}$, is one of the most promising and widely studied solid electrolytes. However, the conventional formulation of NASICON provides insufficient performance at room temperature, requiring the use of the higher temperature rhombohedral phase.

Originally developed by Hong and Goodenough, $Na_3Zr_2Si_2PO_{12}$ exhibits fast sodium ion mobility through a three-dimensional solid network. See H. Y.-P. Hong, *Mater. Res. Bull.* 11:173-182 (1976) and Goodenough, J., et al., *Mater. Res. Bull.* 11:203-220 (1976). The mobility of base NASICON is affected by substitutional doping, and understanding this effect provides a meaningful route to enhance the sodium conductivity. In Boilot, J. P., et al., *J. Solid State Chem.* 73:160-171 (1988), it was demonstrated that adjusting the silicon and phosphorus levels markedly altered the conductivity of $Na_{1+x}Zr_2Si_xP_{3-x}O_{12}$, and could be maximized at x=2 as a result of sodium interactions and sodium oxygen interatomic distance. In contrast, doping the zirconium site in $Na_3Zr_2Si_2PO_{12}$ is not as readily understood in regard to how it modifies NASICON structure and conductivity. Improvement in the conductivity of $Na_3Zr_2Si_2PO_{12}$ was achieved by substituting Zr with 4 mol % yttrium, but the higher total conductivity was explained by enhancing microstructure and greater density rather than a structural or chemical change. See Fuentes, R., et al., *Solid State Ionics* 140:173-179 (2001) and Fuentes, R., et al., *J. European Ceramic Soc.* 21:737-743 (2001).

Several studies have been published investigating trends in doping effects. See Miyajima, Y., et al., *Solid State Ionics* 124:201-211 (1999); M. Na, *Solid State Ionics* 124:201-211 (1999); Saito, Y., et al., *Solid State Ionics* 58:327-331 (1992); Takahashi, T., et al., *Solid State Ionics* 1:163-175 (1980); A. Feltz and S. Barth, *Solid State Ionics* 9:817-821 (1983); and Miyajima, Y., et al., *Solid State Ionics* 84:61-64 (1996). It has been demonstrated that ionic conductivity increases with transition metal radius doped at the octahedral zirconium site. See Saito, Y., et al., *Solid State Ionics* 58:327-331 (1992) and Miyajima, Y., et al., *Solid State Ionics* 84:61-64 (1996). However, the evidence for this trend has been drawn from doping the silicon-free and much less conductive $NaZrP_3O_{12}$ (NZP) compositional end member. Unlike $NaZrP_3O_{12}$ which is stable in the rhombohedral structure at room temperature, $Na_3Zr_2Si_2PO_{12}$ shows a transition to a low temperature monoclinic phase around 175° C. See Alpen, U. V. et al., *Materials Research Bulletin* 14:1317-1322 (1979); Feist, T., et al., *Thermochemica Acta* 106:57-61 (106); and Bukun, N. G., *Ionics* 2:63-68 (1996).

Following this trend to the extreme, Miyajima showed that the largest ion soluble in NZP is dysprosium, after which maximum solid solubility drops to near dilute doping levels. See Miyajima, Y., et al., *Solid State Ionics* 84:61-64 (1996).

No such trend has been discovered in supertonic NASICON. Solid solubility in NASICON may not be as tolerant to large radii, as suggested by Takahashi's observation of low yttrium solubility in NASICON despite the solubility of dysprosium—having a large ionic radius—in NZP. See Takahashi, T., et al., *Solid State Ionics* 1:163-167 (1980).

Solid NASICON electrolytes prepared using $Al_2O_3$, $Fe_2O_3$, $Sb_2O_3$, $Yb_2O_3$, and $Dy_2O_3$ as dopants were disclosed in U.S. Patent Application No. 2015/0249262.

The present invention provides several NASICON type materials where the metal ion is sodium and in which the zirconium site has been doped with a +2 oxidation state cation. Surprisingly, it has been found that aliovalent dopants can increase the conductivity of the solid electrolyte.

BRIEF SUMMARY OF THE INVENTION

In some embodiments, the present invention provides a solid electrolyte of formula (I):

$$Na_{3+2x}M_xZr_{2-x}Si_2PO_{12} \qquad (I)$$

wherein

M is a metal ion selected from the group consisting of $Co^{2+}$, $Ni^{2+}$, and $Zn^{2+}$; and x is between 0.01 and 3.

In some embodiments, the solid electrolyte has an x value between 0.1 and 1.2. In some embodiments, the solid electrolyte has an x value between 0.1 and 0.3. In some embodiments, the solid electrolyte has an x value of 0.2.

In some embodiments, the metal ion in the solid electrolyte is $Co^{2+}$. In some embodiments, the metal ion in the solid electrolyte is $Ni^{2+}$. In some embodiments, the metal ion in the solid electrolyte is $Zn^{2+}$.

In some embodiments, the solid electrolyte is $Na_{3.4}Zr_{1.8}Co_{0.2}Si_2PO_{12}$, $Na_{3.4}Zr_{1.8}Ni_{0.2}Si_2PO_{12}$, or $Na_{3.4}Zr_{1.8}Zn_{0.2}Si_2PO_{12}$.

In some embodiments, the solid electrolyte has ionic conductivity at 25° C. between 0.1 and 0.0001 S/cm. In some embodiments, the solid electrolyte has ionic conductivity at 25° C. between 0.1 and 0.001 S/cm.

In some embodiments, the present inventions provides a method of producing a solid electrolyte comprising:
  (a) ball milling a sodium source, a silicon source, a phosphate source, a zirconium source, and a dopant to produce a ball milled powder;
  (b) calcining the ball milled powder to produce a calcined powder; and
  (c) sintering the calcined powder to produce a solid electrolyte;
wherein the dopant is a cobalt source, a nickel source, or a zinc source.

In some embodiments, the sodium source is $Na_2CO_3$, the silicon source is $SiO_2$, the phosphate source is $Na_2HPO_4.7H_2O$, and the zirconium source is $ZrO_2$.

In some embodiments, the dopant for the solid electrolyte is $Co(NO_3)_2.6H_2O$, NiO, or ZnO. In some embodiments, the dopant is $Co(NO_3)_2.6H_2O$. In some embodiments, the dopant is NiO. In some embodiments, the dopant is ZnO.

In some embodiments, the method of producing the solid electrolyte comprises calcining the ball milled powder at a temperature between 600° C. and 1200° C. In some embodiments, the method of producing the solid electrolyte comprises calcining the ball milled powder at a temperature between 600° C. and 1100° C.

In some embodiments, the method of producing the solid electrolyte comprises sintering the calcined powder at a temperature between 900° C. and 1400° C. In some embodiments, the method of producing the solid electrolyte comprises sintering the calcined powder at a temperature between 1000° C. and 1300° C.

In some embodiments, the present invention provides a sodium ion battery comprising a solid electrolyte, wherein the solid electrolyte is of formula (I):

$$Na_{3+2x}M_xZr_{2-x}Si_2PO_{12} \qquad (I)$$

wherein

M is a metal ion selected from the group consisting of $Co^{2+}$, $Ni^{2+}$, and $Zn^{2+}$; and x is between 0.01 and 3.

In some embodiments, the solid electrolyte in the sodium ion battery is $Na_{3.4}Zr_{1.8}Co_{0.2}Si_2PO_{12}$, $Na_{3.4}Zr_{1.8}Ni_{0.2}Si_2PO_{12}$, or $Na_{3.4}Zr_{1.8}Zn_{0.2}Si_2PO_{12}$.

In some embodiments, the solid electrolyte in the sodium ion battery is $Na_{3.4}Zr_{1.8}Co_{0.2}Si_2PO_{12}$.

BRIEF DESCRIPTION OF THE DRAWINGS

The accompanying drawings, which are incorporated herein and form a part of the specification, illustrate one or more embodiments of the present invention and, together with the description, further serve to explain the principles of the invention and to enable a person skilled in the pertinent art to make and use the invention. The following drawings are given by way of illustration only, and thus are not intended to limit the scope of the present invention.

DETAILED DESCRIPTION OF THE INVENTION

Figure 1:
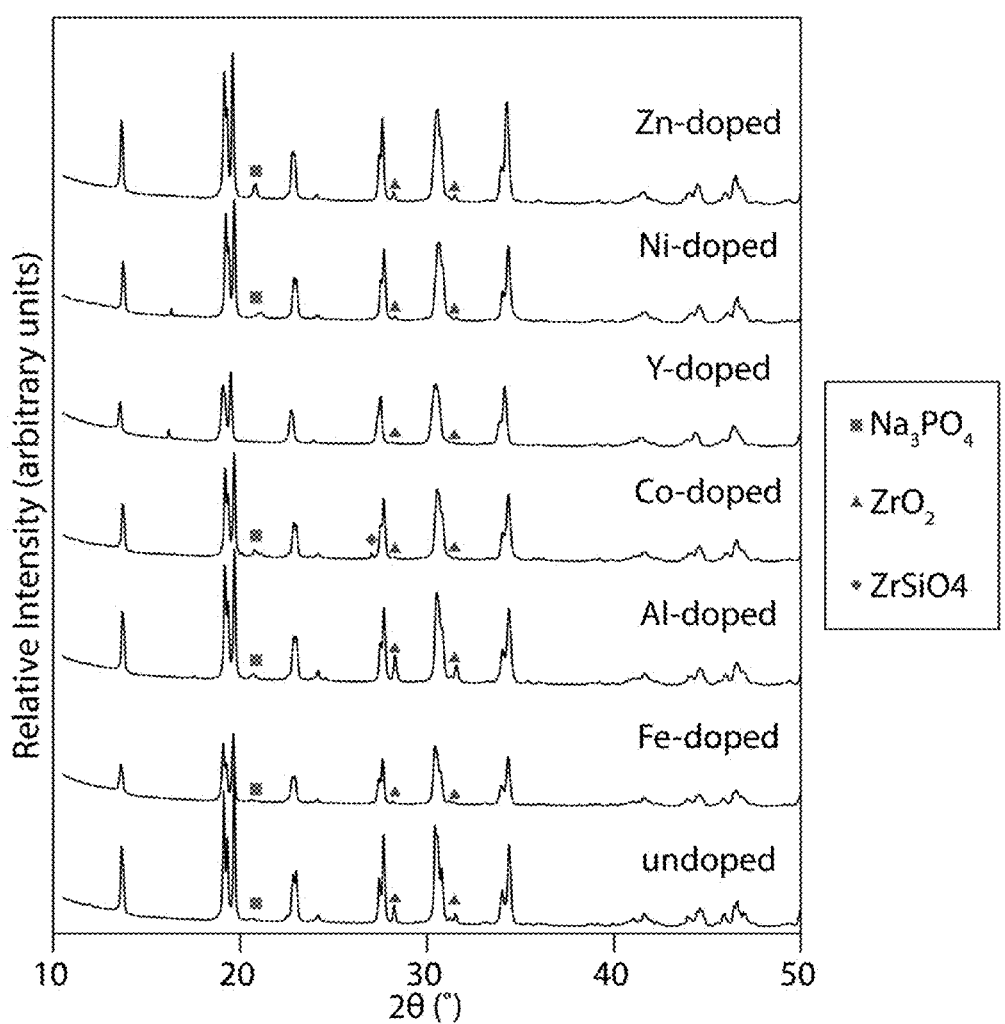
FIG. 1 shows X-ray diffraction data for doped and undoped NASICON. Rectangles represent $Na_3PO_4$ impurities, triangles represent $ZrO_2$ impurities, and diamonds represent $ZrSiO_4$ impurities. All other unlabeled peaks represent monoclinic $Na_3Zr_2Si_2PO_{12}$.

As used herein, the singular terms "a" and "the" are synonymous and used interchangeably with "one or more" and "at least one," unless the language and/or context clearly indicates otherwise. As used herein, the term "comprising" means including, made up of, and composed of.

All numbers in this description indicating amounts, ratios of materials, physical properties of materials, and/or use are to be understood as modified by the word "about," except as otherwise explicitly indicated.

The term "about" as used herein includes the recited number ±10%. Thus, "about ten" means 9 to 11.

In some embodiments, the present invention provides a solid electrolyte of formula (I):

$$Na_{3+2x}M_xZr_{2-x}Si_2PO_{12} \quad (I)$$

wherein

M is a metal ion selected from the group consisting of $Co^{2+}$, $Ni^{2+}$ and $Zn^{2+}$, and x is between 0.01 and 3.

In some embodiments, x is between 0.01 and 3, between 0.01 and 2.5, between 0.01 and 2.0, between 0.01 and 1.5, between 0.01 and 1.3, between 0.01 and 1.2, between 0.01 and 1.1, between 0.01 and 1, between 0.01 and 0.9, between 0.01 and 0.8, between 0.01 and 0.7, between 0.01 and 0.5, between 0.01 and 0.1, between 0.01 and 0.05, between 0.05 and 3, between 0.05 and 2.5, between 0.05 and 2, between 0.05 and 1.5, between 0.05 and 1.3, between 0.05 and 1.2, between 0.05 and 1.1, between 0.05 and 1, between 0.05 and 0.9, between 0.05 and 0.8, between 0.05 and 0.7, between 0.05 and 0.5, between 0.05 and 0.1, between 0.1 and 3, between 0.1 and 2.5, between 0.1 and 2, between 0.1 and 1.5, between 0.1 and 1.3, between 0.1 and 1.2, between 0.1 and 1.1, between 0.1 and 1, between 0.1 and 0.9, between 0.1 and 0.8, between 0.1 and 0.7, between 0.1 and 0.5, between 0.1 and 0.3, and between 0.1 and 0.2, between 0.5 and 3, between 0.5 and 2.5, between 0.5 and 2, between 0.5 and 1.5, between 0.5 and 1.3, between 0.5 and 1.2, between 0.5 and 1.1, between 0.5 and 1, between 0.5 and 0.9, between 0.5 and 0.8, between 0.5 and 0.7, between 0.7 and 3, between 0.7 and 2.5, between 0.7 and 2, between 0.7 and 1.5, between 0.7 and 1.3, between 0.7 and 1.2, between 0.7 and 1.1, between 0.7 and 1, between 0.7 and 0.9, between 0.7 and 0.8, between 0.8 and 3, between 0.8 and 2.5, between 0.8 and 2, between 0.8 and 1.5, between 0.8 and 1.3, between 0.8 and 1.2, between 0.8 and 1.1, between 0.8 and 1, between 0.8 and 0.9, between 0.9 and 3, between 0.9 and 2.5, between 0.9 and 2, between 0.9 and 1.5, between 0.9 and 1.3, between 0.9 and 1.2, between 0.9 and 1.1, between 0.9 and 1, between 1 and 3, between 1 and 2.5, between 1 and 2, between 1 and 1.5, between 1 and 1.3, between 1 and 1.2, between 1 and 1.1, between 1.1 and 3, between 1.1 and 2.5, between 1.1 and 2, between 1.1 and 1.5, between 1.1 and 1.3, between 1.1 and 1.2, between 1.2 and 3, between 1.2 and 2.5, between 1.2 and 2, between 1.2 and 1.5, between 1.2 and 1.3, between 1.3 and 3, between 1.3 and 2.5, between 1.3 and 2, between 1.3 and 1.5, between 1.5 and 3, between 1.5 and 2.5, between 1.5 and 2, between 2 and 3, between 2 and 2.5, and between 2.5 and 3. In some embodiments, x is 0.2.

As shown in FIG. 1, the solid electrolytes of Formula (I) may contain impurities. Thus, the measured molar ratios for Na, M, Zr, Si, P, and O may differ from the theoretical ratios. The values for x are to be understood as modified by the word "about." Therefore, a value of x=1 is understood to mean x=1±0.1. For example, a value of x=1 is understood to mean 0.9 to 1.1.

The molar ratios for Si, P, and O are also understood as modified by the word "about." Therefore, a value of P=1 is understood to mean P=1±0.1. For example, a value of P=1 is understood to mean 0.9 to 1.1.

In some embodiments, M is a metal ion which is $Co^{2+}$, $Ni^{2+}$, or $Zn^{2+}$. In some embodiments, M is a metal ion which is $Co^{2+}$. In some embodiments, M is a metal ion which is $Ni^{2+}$. In some embodiments, M is a metal ion which is $Zn^{2+}$.

The charge imbalance created by aliovalent substitution increases the sodium in the lattice and results in more charge carriers with better mobility. Furthermore, the conductivity was enhanced by the ionic radius of the species in the zirconium site.

In some embodiments, the solid electrolyte of the present invention possesses high ion conductivity at temperatures below 300° C., below 200° C., below 150° C., below 100° C., below 90° C., below 80° C., below 70° C., below 60° C., below 50° C., below 40° C., or below 30° C. In some embodiments, the solid electrolytes possess high ion conductivity at temperatures between 28° C. and 18° C., between 28° C. and 19° C., between 28° C. and 20° C., between 28° C. and 21° C., between 28° C. and 22° C., between 28° C. and 23° C., between 28° C. and 24° C., between 28° C. and 25° C., between 28° C. and 26° C., between 28° C. and or 27° C., between 27° C. and 18° C., between 27° C. and 19° C., between 27° C. and 20° C., between 27° C. and 21° C., between 27° C. and 22° C., between 27° C. and 23° C., between 27° C. and 24° C., between 27° C. and 25° C., between 27° C. and 26° C., between 26° C. and 18° C., between 26° C. and 19° C., between 26° C. and 20° C., between 26° C. and 21° C., between 26° C. and 22° C., between 26° C. and 23° C., between 26° C. and 24° C., between 26° C. and 25° C., between 25° C. and 18° C., between 25° C. and 19° C., between 25° C. and 20° C., between 25° C. and 21° C., between 25° C. and 22° C., between 25° C. and 23° C., between 25° C. and 24° C., between 24° C. and 18° C., between 24° C. and 19° C., between 24° C. and 20° C., between 24° C. and 21° C., between 24° C. and 22° C., between 24° C. and 23° C., between 23° C. and 18° C., between 23° C. and 19° C., between 23° C. and 20° C., between 23° C. and 21° C., between 23° C. and 22° C., between 22° C. and 18° C., between 22° C. and 19° C., between 22° C. and 20° C., between 22° C. and 21° C., between 21° C. and 18° C., between 21° C. and 19° C., between 21° C. and 20° C., between 20° C. and 18° C., between 20° C. and 19° C., or between 19° C. and 18° C.

In some embodiments, the solid electrolyte possesses an ion conductivity between 0.1 and 0.001 S/cm, between 0.1 and 0.002 S/cm, between 0.1 and 0.005 S/cm, between 0.1 and 0.01 S/cm, between 0.1 and 0.015 S/cm, between 0.1 and 0.018 S/cm, between 0.1 and 0.02 S/cm, between 0.1 and 0.025 S/cm, between 0.1 and 0.03 S/cm, between 0.03 and 0.001 S/cm, between 0.03 and 0.002 S/cm, between 0.03 and 0.005 S/cm, between 0.03 and 0.01 S/cm, between 0.03 and 0.015 s/cm, between 0.03 and 0.018 S/cm, between 0.03 and 0.02 S/cm, between 0.03 and 0.025 S/cm, between 0.025 and 0.001 S/cm, between 0.025 and 0.002 S/cm, between 0.025 and 0.005 S/cm, between 0.025 and 0.01 S/cm, between 0.025 and 0.015 S/cm, between 0.025 and 0.018 S/cm, between 0.025 and 0.02 S/cm, between 0.02 and 0.001 S/cm, between 0.02 and 0.005 S/cm, between 0.02 and 0.01 S/cm, between 0.02 and 0.015 S/cm, between 0.02 and 0.018 S/cm, between 0.018 and 0.001 S/cm, between 0.018 and 0.005 S/cm, between 0.018 and 0.01 S/cm, between 0.018 and 0.015 S/cm, between 0.015 and 0.001 S/cm, between 0.015 and 0.005 S/cm, between 0.015 and 0.01 S/cm, between 0.01 and 0.001 S/cm, between 0.01 and 0.005 S/cm, or between 0.005 and 0.001 S/cm.

In some embodiments, the solid electrolyte possesses ion conductivity at 25° C. between 0.1 and 0.001 S/cm, between 0.1 and 0.002 S/cm, between 0.1 and 0.005 S/cm, between 0.1 and 0.01 S/cm, between 0.1 and 0.015 S/cm, between 0.1 and 0.018 S/cm, between 0.1 and 0.02 S/cm, between 0.1 and 0.025 S/cm, between 0.1 and 0.03 S/cm, between 0.03 and 0.001 S/cm, between 0.03 and 0.002 S/cm, between 0.03 and 0.005 S/cm, between 0.03 and 0.01 S/cm, between 0.03 and 0.015 S/cm, between 0.03 and 0.018 S/cm, between 0.03 and 0.02 S/cm, between 0.03 and 0.025 S/cm, between 0.025 and 0.001 S/cm, between 0.025 and 0.002 S/cm, between 0.025 and 0.005 S/cm, between 0.025 and 0.01 S/cm, between 0.025 and 0.015 S/cm, between 0.025 and 0.018 S/cm, between 0.025 and 0.02 S/cm, between 0.02 and 0.001 S/cm, between 0.02 and 0.005 S/cm, between 0.02 and 0.01 S/cm, between 0.02 and 0.015 S/cm, between 0.02 and 0.018 S/cm, between 0.018 and 0.001 S/cm, between 0.018 and 0.005 S/cm, between 0.018 and 0.01 S/cm, between 0.018 and 0.015 S/cm, between 0.015 and 0.001 S/cm, between 0.015 and 0.005 S/cm, between 0.015 and 0.01 S/cm, between 0.01 and 0.001 S/cm, between 0.01 and 0.005 S/cm, or between 0.005 and 0.001 S/cm.

In some embodiments, the solid electrolyte disclosed herein may be used or produced in any suitable form as would be understood by one of ordinary skill in the art. In some embodiments, the form of the solid electrolyte may be a membrane and may include at least one of the following: monolithic flat plate geometries, supported structures in flat plate geometries, monolithic tubular geometries, supported structures in tubular geometries, monolithic honeycomb geometries, or supported structures in honeycomb geometries.

In some embodiments, the solid electrolyte membranes may be composites of solid electrolytes with non-conductive materials, where the non-conductive materials are poor ionic and electronic electrical conductors under the conditions of use. A variety of insulative non-conductive materials are also known in the art, as would be understood by one of ordinary skill in the art. In some specific embodiments, the non-conductive materials may include at least one of the following: ceramic materials, polymers, and/or plastics that are substantially stable in the media to which they are exposed.

Layered solid electrolyte-polymer composite membranes are also particularly suitable for use as alkali-ion conducting ceramic membranes in the present invention. Layered alkali-ion conducting material-polymer composite membranes generally comprise ion-selective polymers layered on solid electrolytes. Ion-selective polymer materials have the disadvantage of having poor selectively to sodium ions, yet they demonstrate the advantage of high chemical stability.

In some specific embodiments, the solid electrolyte membrane may comprise two or more co-joined layers of different solid electrolytes. Such co-joined solid electrolyte membrane layers could include solid electrolytes disclosed herein joined to other solid electrolytes, such as, but not limited to, β-alumina. Such co-joined layers could be joined to each other using a method such as, but not limited to, thermal spraying, plasma spraying, co-firing, joining following sintering, etc. Other suitable joining methods are known by one of ordinary skill in the art and are included herein.

One of ordinary skill in the art would understand that a number of processing methods are known for processing the solid electrolytes such as high temperature solid-state reaction processes, co-precipitation processes, hydrothermal processes, or sol-gel processes. In some embodiments, it may be advantageous to synthesize the solid electrolytes by high temperature solid-state reaction processes. In some embodiments, the solid electrolytes may be systematically synthesized by solid-state mixing techniques. A mixture of the starting materials may be mixed in an organic solvent, and the mixture of starting materials dried to evolve the organic solvent. In some embodiments, the organic solvent is ethanol or methanol. In some embodiments, the drying is at a temperature greater than 50° C., greater than 70° C., greater than 90° C., greater than 100° C., greater than 150° C., or greater than 200° C.

In some embodiments, the present invention discloses a method of producing a solid electrolyte comprising:

(a) ball milling a sodium source, a silicon source, a phosphate source, a zirconium source, and a dopant to produce a ball milled powder;

(b) calcining the ball milled powder to produce a calcined powder; and (c) sintering the calcined powder to produce a solid electrolyte;

wherein the dopant is a cobalt source, a nickel source, or a zinc source.

In some embodiments, the sodium source is $Na(OCH_3)$, $Na(OC_2H_5)$, $Na(OC_3H_7)$, or $Na_2CO_3$. In some embodiments, the sodium source is $Na_2CO_3$.

In some embodiments, the silicon source is $Si(OCH_3)_4$, $Si(OC_2H_5)_4$, or $SiO_2$. In some embodiments, the silicon source is $SiO_2$.

In some embodiments, the phosphate source is $P(OC_3H_7)_3$, $P(O)H(OC_4H_9)_2$, $NH_4H_2PO_4$, or $Na_2HPO_4.7H_2O$. In some embodiments, the phosphate source is $Na_2HPO_4.7H_2O$.

In some embodiments, the zirconium source is $Zr(OC_3H_7)_4$, $Zr(OC_4H_9)_4$, or $ZrO_2$. In some embodiments, the zirconium source is $ZrO_2$.

In some embodiments, the cobalt source is $CoO$, $Co_2O_3$, $Co_3O_4$, $Ca_3Co_4O_9$, $Al_2CoO_4$, or $Co(NO_3).6H_2O$. In some embodiments, the cobalt source is $Co(NO_3).6H_2O$.

In some embodiments, the nickel source is $Ni(OH)_2$, $NiCO_3$, $NiNO_3$, or $NiO$. In some embodiments, the nickel source is $NiO$.

In some embodiments, the zinc source is $Zn(NO_3)_2$, $Zn(CH_3COO)_2$, or $ZnO$. In some embodiments, the zinc source is $ZnO$.

In some embodiments, the mixture of starting materials is ball milled. In some embodiments, the mixture of starting materials is ball milled for at least 30 minutes, at least 1 hour, at least 5 hours, at least 10 hours, at least 15 hours, at least 20 hours, at least 24 hours, at least 30 hours, or at least 50 hours. In some embodiments, the mixture of starting materials is ball milled for between 30 minutes and 50 hours, between 30 minutes and 30 hours, between 30 minutes and 24 hours, between 30 minutes and 20 hours, between 30 minutes and 15 hours, between 30 minutes and 10 hours, between 30 minutes and 5 hours, between 30 minutes and 1 hour, between 1 hour and 50 hours, between 1 hour and 30 hours, between 1 hour and 24 hours, between 1 hour and 20 hours, between 1 hour and 15 hours, between 1 hour and 10 hours, or between 1 hour and 5 hours.

In some embodiments, the ball milled mixture is calcined. In some embodiments, the ball milled mixture is calcined at a temperature between 500° C. and 2000° C., between 500°

C. and 1500° C., between 500° C. and 1400° C., between 500° C. and 1300° C., between 500° C. and 1200° C., between 500° C. and 1100° C., between 500° C. and 1000° C., between 500° C. and 900° C., between 500° C. and 800° C., between 800° C. and 2000° C., between 800° C. and 1500° C., between 800° C. and 1400° C., between 800° C. and 1300° C., between 800° C. and 1200° C., between 800° C. and 1100° C., between 800° C. and 1000° C., between 800° C. and 900° C., between 900° C. and 2000° C., between 900° C. and 1500° C., between 900° C. and 1400° C., between 900° C. and 1300° C., between 900° C. and 1200° C., between 900° C. and 1100° C., between 900° C. and 1000° C., between 1000° C. and 2000° C., between 1000° C. and 1500° C., between 1000° C. and 1400° C., between 1000° C. and 1300° C., between 1000° C. and 1200° C., between 1000° C. and 1100° C., between 1100° C. and 2000° C., between 1100° C. and 1500° C., between 1100° C. and 1400° C., between 1100° C. and 1300° C., between 1100° C. and 1200° C., between 1200° C. and 2000° C., between 1200° C. and 1500° C., between 1200° C. and 1400° C., between 1200° C. and 1300° C., between 1300° C. and 2000° C., between 1300° C. and 1500° C., between 1300° C. and 1400° C., between 1400° C. and 2000° C., between 1400° C. and 1500° C., or between 1500° C. and 2000° C.

In some embodiments, the ball milled mixture is calcined for at least 30 minutes, at least 1 hour, at least 5 hours, at least 10 hours, at least 15 hours, at least 20 hours, at least 24 hours, at least 30, or at least 50 hours. In some embodiments, the ball milled mixture is calcined for between 30 minutes and 50 hours, between 30 minutes and 30 hours, between 30 minutes and 24 hours, between 30 minutes and 20 hours, between 30 minutes and 15 hours, between 30 minutes and 10 hours, between 30 minutes and 5 hours, between 30 minutes and 1 hour, between 1 hour and 50 hours, between 1 hour and 30 hours, between 1 hour and 24 hours, between 1 hour and 20 hours, between 1 hour and 15 hours, between 1 hour and 10 hours, or between 1 hour and 5 hours.

In some embodiments, the calcined mixture is milled with media such as stabilized-zirconia or alumina or another media known to one of ordinary skill in the art to achieve the prerequisite particle size distribution. To achieve the prerequisite particle size distribution, the calcined mixture may be milled using a technique such as vibratory milling, attrition milling, jet milling, ball milling, or another technique known to one of ordinary skill in the art, using media such as stabilized-zirconia, alumina, or another media known to one of ordinary skill in the art.

One of ordinary skill in the art would understand that a number of conventional fabrication processing methods are known for processing membranes such as those set forth above in a green-form. Such methods include, but are not limited to, tape casting, calendaring, embossing, punching, laser-cutting, solvent bonding, lamination, heat lamination, extrusion, co-extrusion, centrifugal casting, slip casting, gel casting, die casting, pressing, isostatic pressing, hot isostatic pressing, uniaxial pressing, and sol gel processing. The resulting green-form membrane may then be sintered to form an alkali cation-conductive membrane using a technique known to one of ordinary skill in the art, such as conventional thermal processing in air, or controlled atmospheres to minimize loss of individual components of the alkali cation-conductive membranes. In some embodiments of the present invention it may be advantageous to fabricate the ceramic membrane in a green-form by die-pressing, optionally followed by isostatic pressing. In other embodiments of the present invention it may potentially be advantageous to fabricate the ceramic membrane as a multi-channel device in a green-form using a combination of techniques such as tape casting, punching, laser-cutting, solvent bonding, heat lamination, or other techniques known to one of ordinary skill in the art.

In some embodiments, the calcined mixture is sintered. In some embodiments, the calcined mixture is sintered at a temperature between 500° C. and 2000° C., between 500° C. and 1500° C., between 500° C. and 1400° C., between 500° C. and 1300° C., between 500° C. and 1200° C., between 500° C. and 1100° C., between 500° C. and 1000° C., between 500° C. and 900° C., between 500° C. and 800° C., between 800° C. and 2000° C., between 800° C. and 1500° C., between 800° C. and 1400° C., between 800° C. and 1300° C., between 800° C. and 1200° C., between 800° C. and 1100° C., between 800° C. and 1000° C., between 800° C. and 900° C., between 900° C. and 2000° C., between 900° C. and 1500° C., between 900° C. and 1400° C., between 900° C. and 1300° C., between 900° C. and 1200° C., between 900° C. and 1100° C., between 900° C. and 1000° C., between 1000° C. and 2000° C., between 1000° C. and 1500° C., between 1000° C. and 1400° C., between 1000° C. and 1300° C., between 1000° C. and 1200° C., between 1000° C. and 1100° C., between 1100° C. and 2000° C., between 1100° C. and 1500° C., between 1100° C. and 1400° C., between 1100° C. and 1300° C., between 1100° C. and 1200° C., between 1200° C. and 2000° C., between 1200° C. and 1500° C., between 1200° C. and 1400° C., between 1200° C. and 1300° C., between 1300° C. and 2000° C., between 1300° C. and 1500° C., between 1300° C. and 1400° C., between 1400° C. and 2000° C., between 1400° C. and 1500° C., or between 1500° C. and 2000° C.

In some embodiments, the calcined mixture is sintered for at least 30 minutes, at least 1 hour, at least 5 hours, at least 10 hours, at least 15 hours, at least 20 hours, at least 24 hours, at least 30, or at least 50 hours. In some embodiments, the calcined mixture is sintered for between 30 minutes and 50 hours, between 30 minutes and 30 hours, between 30 minutes and 24 hours, between 30 minutes and 20 hours, between 30 minutes and 15 hours, between 30 minutes and 10 hours, between 30 minutes and 5 hours, between 30 minutes and 1 hour, between 1 hour and 50 hours, between 1 hour and 30 hours, between 1 hour and 24 hours, between 1 hour and 20 hours, between 1 hour and 15 hours, between 1 hour and 10 hours, or between 1 hour and 5 hours.

Standard x-ray diffraction analysis techniques may be performed to identify the crystal structure and phase purity of the solid electrolytes in the sintered ceramic membrane.

The solid electrolytes disclosed herein may advantageously be used in electrochemical processes that would benefit from low temperature operation, high selectivity for the metal ions, and good current efficiency. In some embodiments, the solid electrolyte is used in a fuel cell, in a battery, in a gas separation membrane, in a chemical sensor, or in an ionic switch. In some embodiments, the solid electrolyte is used in a battery.

The following examples are illustrative and non-limiting of the nanoparticle arrays, methods of making, and methods of using described herein. Suitable modifications and adaptations of the variety of conditions, formulations and other parameters normally encountered in the field and which are obvious to those skilled in the art in view of this disclosure are within the spirit and scope of the invention.

EXAMPLES

Example 1

$Na_{3.2}Zr_{1.8}M_{0.2}Si_2PO_{12}$ ($M=Al^{3+}$, $Fe^{3+}$ and $Y^{3+}$), $Na_{3.4}Zr_{1.8}M_{0.2}Si_2PO_{12}$ ($M=Co^{2+}$, $Ni^{2+}$, and $Zn^{2+}$), and $Na_3Zr_2Si_2PO_{12}$ were synthesized with conventional solid state reaction procedures. The starting materials used were $Na_2CO_3$ (99.95-100.05%, Sigma Aldrich, St. Louis, Mo.), nanocrystalline $ZrO_2$ (Inframat Advanced Materials, Manchester, Conn., 99.9%), amorphous $SiO_2$ (99.80%, Sigma Aldrich, St. Louis, Mo.), and $NH_4HPO_4 \cdot 7H_2O$ (98.0-102.0%, Sigma Aldrich, St. Louis, Mo.), which were mixed with 2% excess phosphorus and sodium to compensate for volatility. The dopant raw materials were mixed stoichiometrically and included $Al_2O_3$ (Inframat Advanced Materials, Manchester, Conn., 99.99%), $Fe_2O_3$ (Sigma Aldrich, St. Louis, Mo., ≥99%), $Y_2O_3$ (Alfa Aesar, Haverhill, Mass., 99.9%), $Co(NO_3)_2 \cdot 6H_2O$ (Carolina, North Charleston, S.C., 98.0-102.0%), NiO (J. T. Baker, Center Valley, Pa., ≥99%), and ZnO (J. T. Baker, Center Valley, Pa., ≥99%). The doping level was set at a nominal 10% to sufficiently alter the NASICON structure, while also retaining relatively high phase purity. The dopants selected were all +2 and +3 oxidation state cations offering a broad range of ionic radii.

The raw materials were ball milled in isopropanol for 24 hours, dried at 100° C., and then calcined at 700° C. and 900° C. prior to sintering. The powders were ground with an agate mortar and pestle and ball milled between and after calcination steps. The calcined materials were pressed into pellets inside a 10 mm steel die with 2,000 pounds of uniaxial force. The pellets were sintered for 12 hours in alumina crucibles at the temperatures provided in Table 1. The heating and cooling rates for calcining and sintering were 5° C. per minute.

TABLE 1

Sintering temperatures and theoretical density for NASICON samples.

| Material | Sintering Temperature (° C.) | Density (% of theoretical) |
|---|---|---|
| Undoped NASICON | 1200 | 96.1 |
| Al doped NASICON | 1150 | 93.1 |
| Fe doped NASICON | 1125 | 94.5 |
| Y doped NASICON | 1200 | 99.2 |
| Co doped NASICON | 1125 | 97.9 |
| Ni doped NASICON | 1150 | 97.1 |
| Zn doped NASICON | 1150 | 96.9 |

X-ray diffraction (XRD) patterns of sintered and ground pellets were collected at room temperature using a Bruker D8 Advance diffractometer (Bruker Corporation, Madison, Wis.) with CuKα radiation and LynxEye detector. Patterns were recorded between 10° C. and 140° C. (2θ) with a 0.02° step size and 1.1 second count time per step.

Quantitative elemental analysis of was conducted on a JEOL 8900 electron probe microanalyzer (JEOL, Tokyo, Japan) using standard wave-dispersive spectroscopy (WDS). The microprobe accelerating voltage was set to 1500 keV, the current was set to 1 nA, the beam diameter was set to 30 µm, and the absorbed current was monitored to detect sample degradation. ZAF correction procedures were employed to extract atomic weight percent from raw X-ray counts, and the stoichiometry was determined by normalizing weight percent to oxygen. Because WDS cannot accurately measure the oxygen content of a material, it was assumed that each material had the typical twelve oxygen atoms per molecular formula of NASICON.

Electrochemical Impedance Spectroscopy (EIS) was used to characterize the ionic conductivity of the sintered pellets. The two faces of the sintered pellets were first polished with silicon carbide paper and then coated with platinum paste to form electrodes and sintered at 700° C. for 1 hour in air. Four wire EIS was measured in air with a Solartron 1260 sweeping from $10^7$ to 1 Hz every 25° C. between 300° C. and 25° C. Bulk and total conductivity were determined from the fitting tools in the Scribner Z-Plot software and the resistance was normalized by the pellet thickness and the electrode area. DC measurements were performed on the platinum sintered pellets at 25° C. in air with a Keithley 2400 Broad Purpose SourceMeter. Measurements were run until the current stabilized, and the electronic conductivity was normalized by pellet thickness and area.

The XRD pattern for the 7 samples is shown in FIG. 1. The patterns were fit using the Reitveld method, which confirmed that all samples exhibited greater than 90% purity, with Y-doped NASICON exhibiting almost 99% purity. Monoclinic $ZrO_2$ was a common impurity for all samples, which is generally observed in all types of NASICON synthesis. The absence of dopant containing secondary phases indicates that the zirconium site was successfully doped. Furthermore, elemental analysis demonstrated the chemical makeup of the sintered ceramic pellets were close to the nominal stoichiometry. The elemental breakdown of all NASICON samples are shown in Table 2. Elemental analysis confirmed that sodium content in the lattice increased with aliovalent substitution, and doping with +2 oxidation state cations resulted in the greatest amount of sodium in the lattice. The density was also maximized for the samples by optimizing sintering temperature. Density was confirmed with a standard Archimedes test in ethanol, and are shown in Table 1 along with the sintering temperature.

TABLE 2

Quantitative elemental analysis by EDS of NASICON samples given in normalized stoichiometry. The elemental weight percentages are normalized on the basis of 12 oxygen atoms in the molecular formula of NASICON.

| Sample | Nominal Stoichiometry | Actual Stoichiometry |
|---|---|---|
| Undoped NASICON | $Na_3Zr_2Si_2PO_{12}$ | $Na_{2.99}Zr_{2.03}Si_{2.07}P_{0.92}O_{12}$ |
| Al doped NASICON | $Na_{3.2}Zr_{1.8}Al_{0.2}Si_2PO_{12}$ | $Na_{3.38}Zr_{1.80}Al_{0.26}Si_{2.06}P_{0.88}O_{12}$ |
| Fe doped NASICON | $Na_{3.2}Zr_{1.8}Fe_{0.2}Si_2PO_{12}$ | $Na_{3.13}Zr_{1.94}Fe_{0.21}Si_{2.12}P_{0.85}O_{12}$ |
| Y doped NASICON | $Na_{3.2}Zr_{1.8}Y_{0.2}Si_2PO_{12}$ | $Na_{3.24}Zr_{1.91}Y_{0.09}Si_{1.93}P_{1.02}O_{12}$ |
| Co doped NASICON | $Na_{3.4}Zr_{1.8}Co_{0.2}Si_2PO_{12}$ | $Na_{3.47}Zr_{1.93}Co_{0.18}Si_{1.97}P_{0.91}O_{12}$ |
| Ni doped NASICON | $Na_{3.4}Zr_{1.8}Ni_{0.2}Si_2PO_{12}$ | $Na_{3.59}Zr_{1.92}Ni_{0.21}Si_{1.93}P_{0.91}O_{12}$ |
| Zn doped NASICON | $Na_{3.4}Zr_{1.8}Zn_{0.2}Si_2PO_{12}$ | $Na_{3.43}Zr_{1.83}Zn_{0.22}Si_{1.93}P_{1.02}O_{12}$ |

The microstructure and total conductivity of the samples was also examined. All of the sample exhibited relatively low porosity, but deviations in the average grain size and particle to particle connectivity between samples was observed. SEM photographs of the sintered pellets are included in a structural investigation of the same materials. See Jolley, A. G. et al., *J. Am. Chem. Soc.* 98:2902-2907 (2015). While the microstructure can influence the total conductivity of the pellets, it should have minimal effect on the bulk conductivity of the material. Thus, the total conductivity reflects the processing of the samples, while bulk conductivity is a function of the inherent material properties.

Figure 2A:
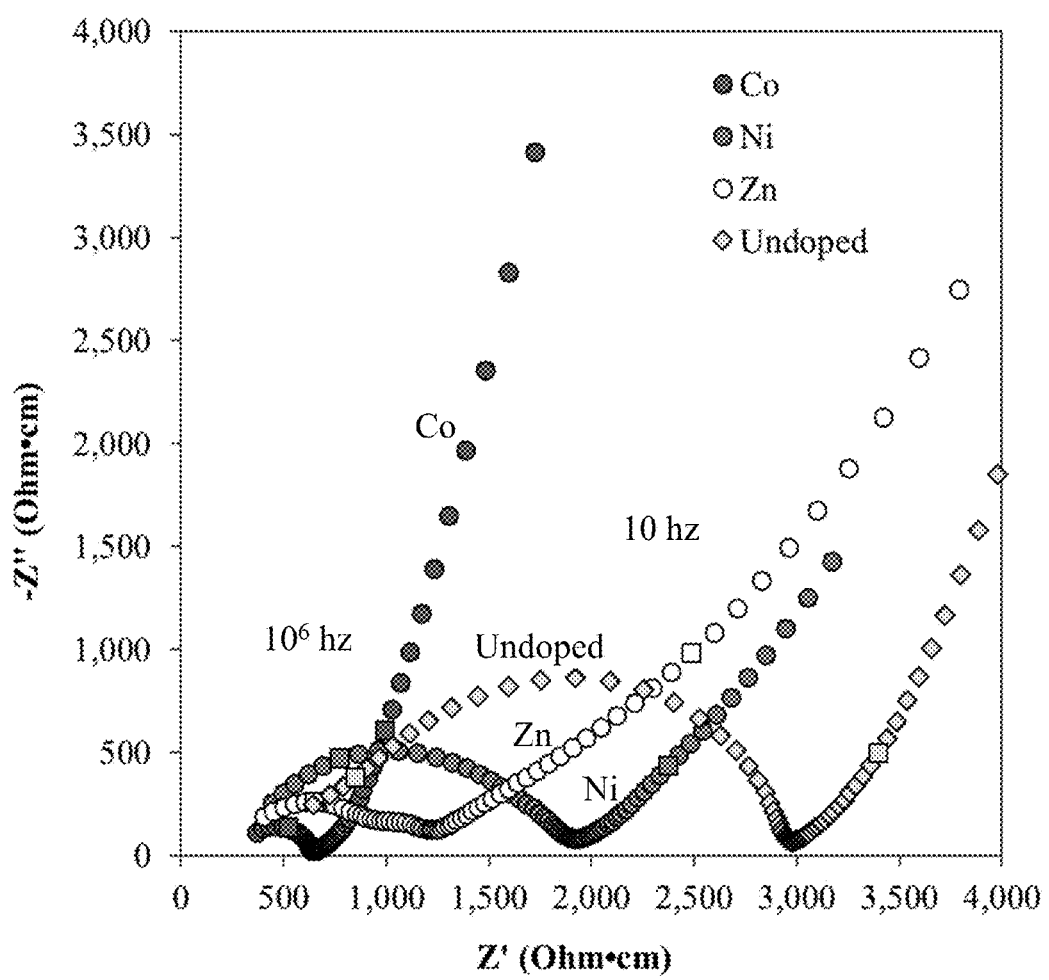
FIG. 2A is an electrochemical impedance spectroscopy (EIS) plot of undoped NASICON and +2 aliovalent doped NASICON electrolytes at 25° C.
Figure 2B:
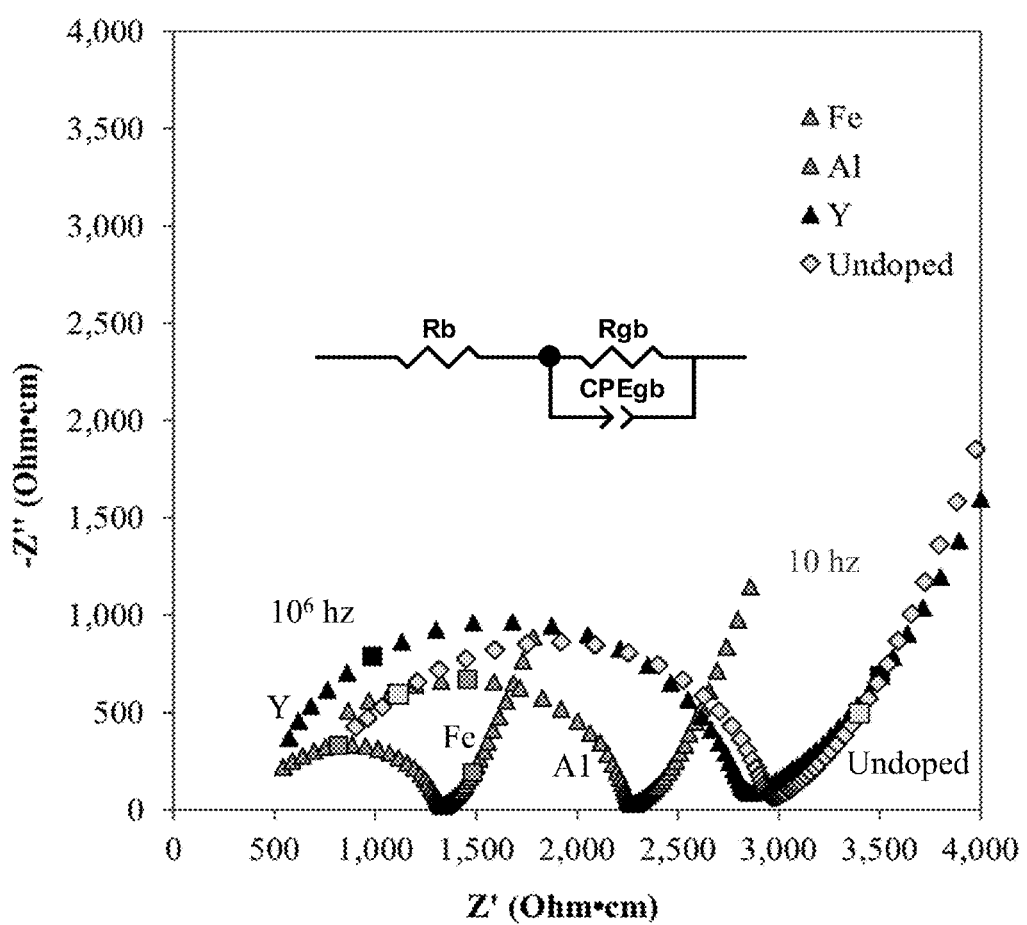
FIG. 2B is an EIS plot of undoped NASICON and +3 doped NASICON at 25° C.

EIS was employed to obtain the conductivity of the samples and to achieve a deeper insight into the electrical properties. The Nyquist plots in FIGS. 2A and 2B illustrate the room temperature impedance of each sample. For this study, the bulk conductivity of the samples was the primary interest. Bulk conductivity divulges the inherent electrochemical properties of the material and is independent from processing flaws such as insulating secondary phases at grain boundaries, porosity, etc. Because the bulk ionic conductivity could be deconvoluted from the total conductivity, insight into the ionic mobility through the NASICON network was ascertained from impedance data.

The Nyquist plots contain both an unresolved and clearly defined semi-circle for all investigated compounds. The unresolved high frequency semi-circle is attributed to ion transport in the grains, while the low frequency semi-circle is caused by ion transport in the grain boundaries. These macroscopic processes of mass and charge transport can be described by an equivalent circuit as shown in the insert in FIG. 2B. The equivalent circuit model consists of two RQ-elements connected in series, corresponding to the two contributions from the grain bulk and grain boundary. Another resistance element $R_c$ in series stands for the electrode-electrolyte contact, which is responsible for the shift of the impedance arc from the origin point. A CPE element Q is used to describe the non-ideal capacitance of the dispersed semi-circle element. Although the bulk resistance arc could not be directly resolved, Scribner Zview software was used to fit the grain boundary resistance arc. The bulk resistance was then identified as the origin of the grain boundary arc at the x-axis, while the total resistance is the end of the grain boundary arc and the origin of the Warburg tail.

Figure 2C:
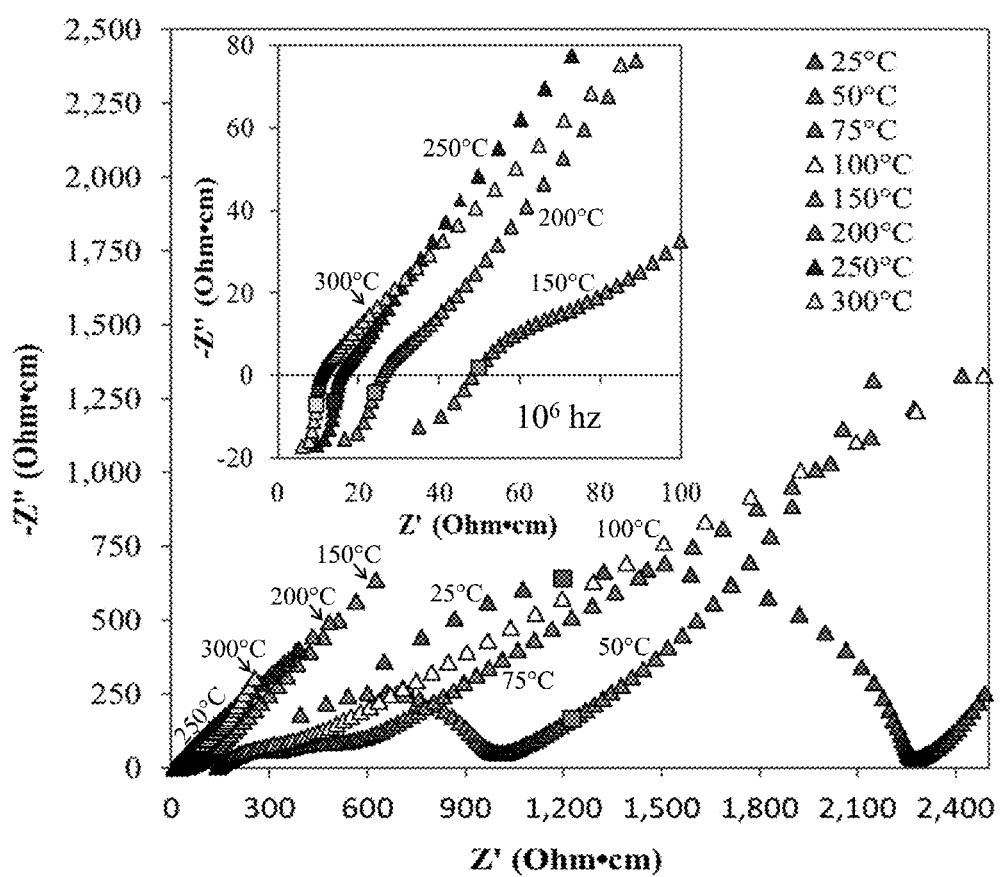
FIG. 2C is an EIS plot of Al doped NASICON at selected temperatures between 25° C. and 300° C.

Bulk conductivity could not be separated from total conductivity for all temperatures. The grain boundary arc dissolved into the Warburg tail above approximately 200° C., as shown in FIG. 2C, and thus the intersection of the impedance with the x-axis is taken as the total resistance. However, since the grain boundary resistance is negligible at higher temperatures, the total resistance is effectively the grain resistance at higher temperatures.

Figure 2D:
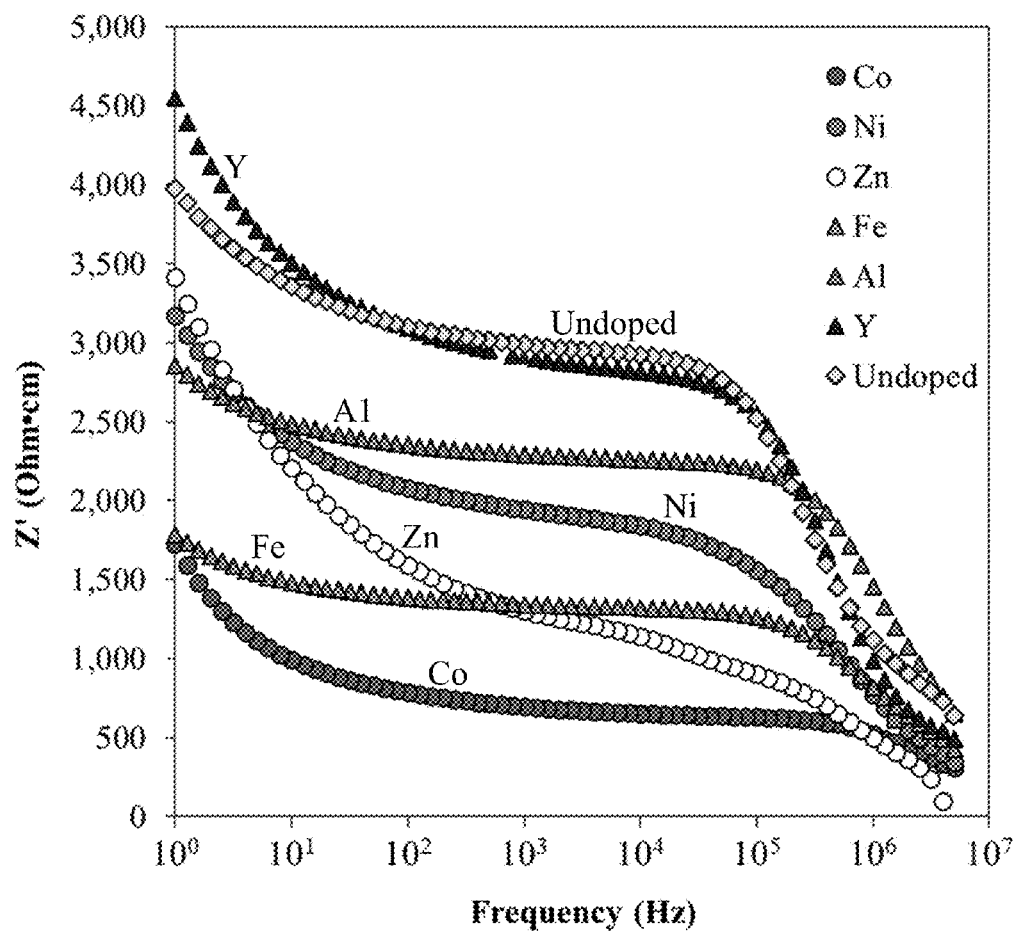
FIG. 2D is an EIS plot of the real part of the complex impedance for undoped NASICON and doped NASICON electrolytes at 25° C.
Figure 2E:
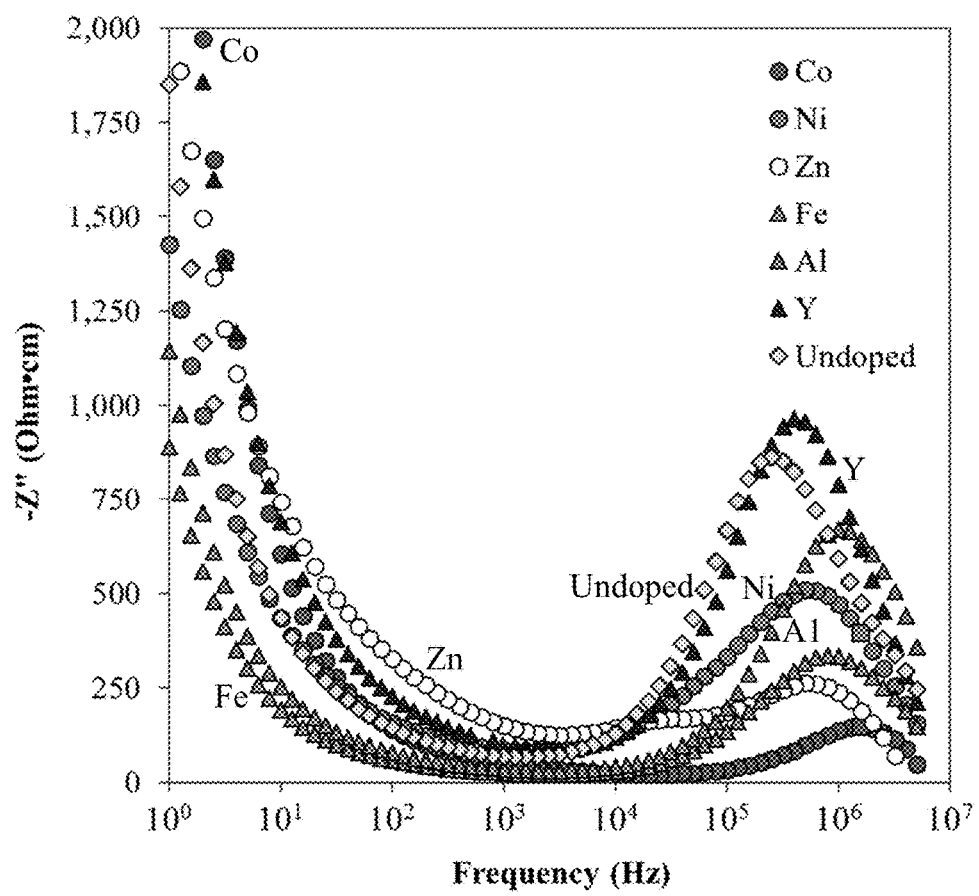
FIG. 2E is an EIS plot of the imaginary part of the complex impedance for undoped NASICON and doped NASICON electrolytes at 25° C.
Figure 2F:
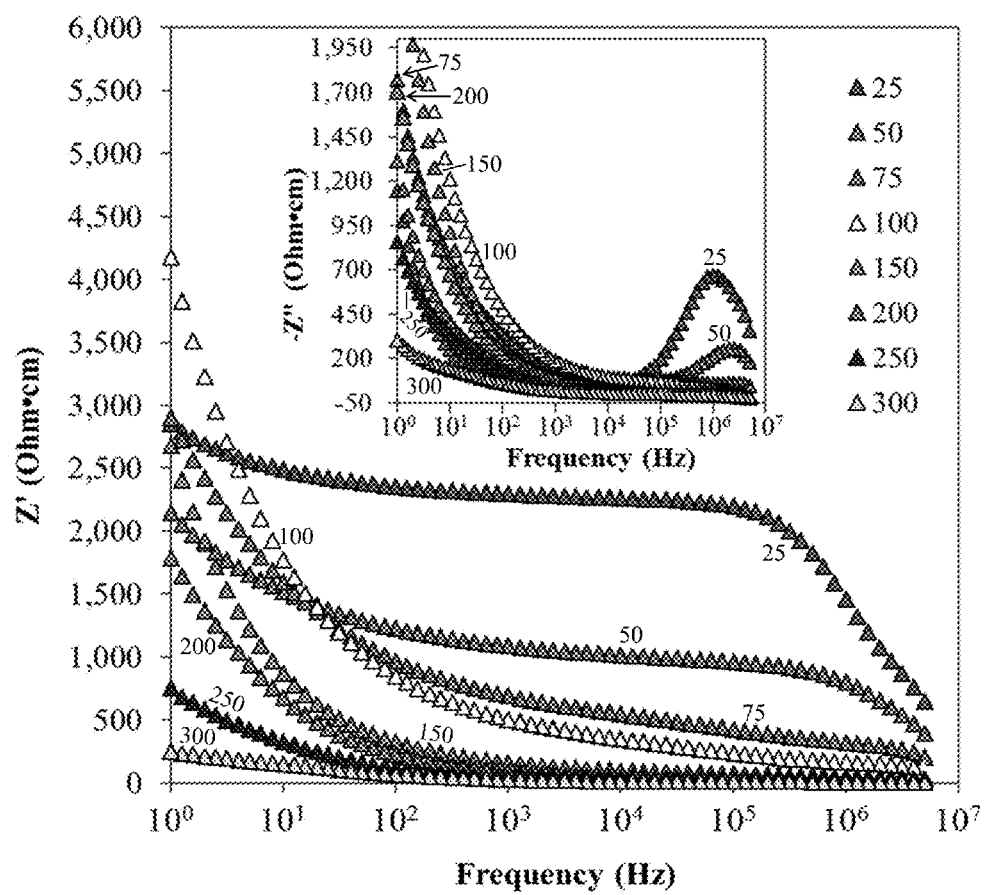
FIG. 2F is an EIS plot of the real and imaginary parts of the complex impedance for Al doped NASICON electrolytes at selected temperatures between 25° C. and 300° C. The first square data point indicates a frequency of $10^6$ Hz while the second square data point indicates 10 Hz. The inset for FIG. 2F is an EIS plot of the relaxation frequencies obtained from the Z″ (frequency dependency of the imaginary parts at 25° C.) versus frequency.

FIG. 2C illustrates the impedance obtained at different temperatures for the Al-doped sample. Up to a temperature of 100° C., the grain boundary arc is clearly observed; however, with increasing temperatures, the arc disappears progressively from the spectra, indicating a thermally activated process with the addition of an inductive contributor. The frequency dependences of the impedance—real and imaginary parts—at 25° C. for all NASICON samples are shown in FIG. 2D (Z') and FIG. 2E (Z"), respectively. A step-like decreasing trend is observed for all the dopants in the real impedance spectra, while a peak shape spectra was obtained from the imaginary part. The plot reveals that the Z" peak occurs in the frequency range from $2 \times 10^5$ to $10^6$ Hz, depending on the sample. This peak corresponds to the middle of the step-like decreasing trend for the real portion, indicating a relaxation behavior of the ions. FIG. 2F shows how the real portion of the impedance varies as a function of temperature for a representative sample (Al doped). The spectra is characterized by two dispersion regions, where the boundary between the two regions shifts towards higher frequencies as the temperature increases. This behavior is another indication of a thermally activated process, and is typical in relaxation-type dispersions. The relaxation frequencies, $f_R$, obtained from the Z" versus frequency graph (insert for FIG. 2F) also exhibit a shift toward higher frequency with increasing temperature.

Table 3 provides the bulk conductivity, total conductivity, and activation energy for each sample. Cobalt doped NASICON exhibited the highest room temperature total conductivity of all the samples, $1.55 \times 10^{-3}$ S/cm. While zinc doped NASICON had superior bulk conductivity, the dense and uniform microstructure of cobalt doped NASICON led to enhanced total conductivity.

TABLE 3

Bulk conductivity and total conductivity for NASICON samples at room temperature. Activation energy is listed for high and low temperatures for non-linear Arrhenius plots.

| Sample | Bulk Conductivity at 25° C. (S/cm) | Total Conductivity at 25° c. (S/cm) | Activation Energy (eV) |
|---|---|---|---|
| Undoped NASICON | $1.34 \times 10^{-3}$ | $3.35 \times 10^{-4}$ | 0.267 |
| Al doped NASICON | $1.77 \times 10^{-3}$ | $4.39 \times 10^{-4}$ | 0.258 |
| Fe doped NASICON | $2.44 \times 10^{-3}$ | $7.53 \times 10^{-4}$ | 0.264 |
| Y doped NASICON | $2.39 \times 10^{-3}$ | $3.52 \times 10^{-4}$ | 0.224 |
| Co doped NASICON | $3.33 \times 10^{-3}$ | $1.55 \times 10^{-3}$ | 0.379 (high T) 0.266 (low T) |
| Ni doped NASICON | $3.47 \times 10^{-3}$ | $6.18 \times 10^{-4}$ | 0.362 (high T) 0.192 (low T) |
| Zn doped NASICON | $3.75 \times 10^{-3}$ | $8.05 \times 10^{-4}$ | 0.321 (high T) 0.221 (low T) |

Figure 3:
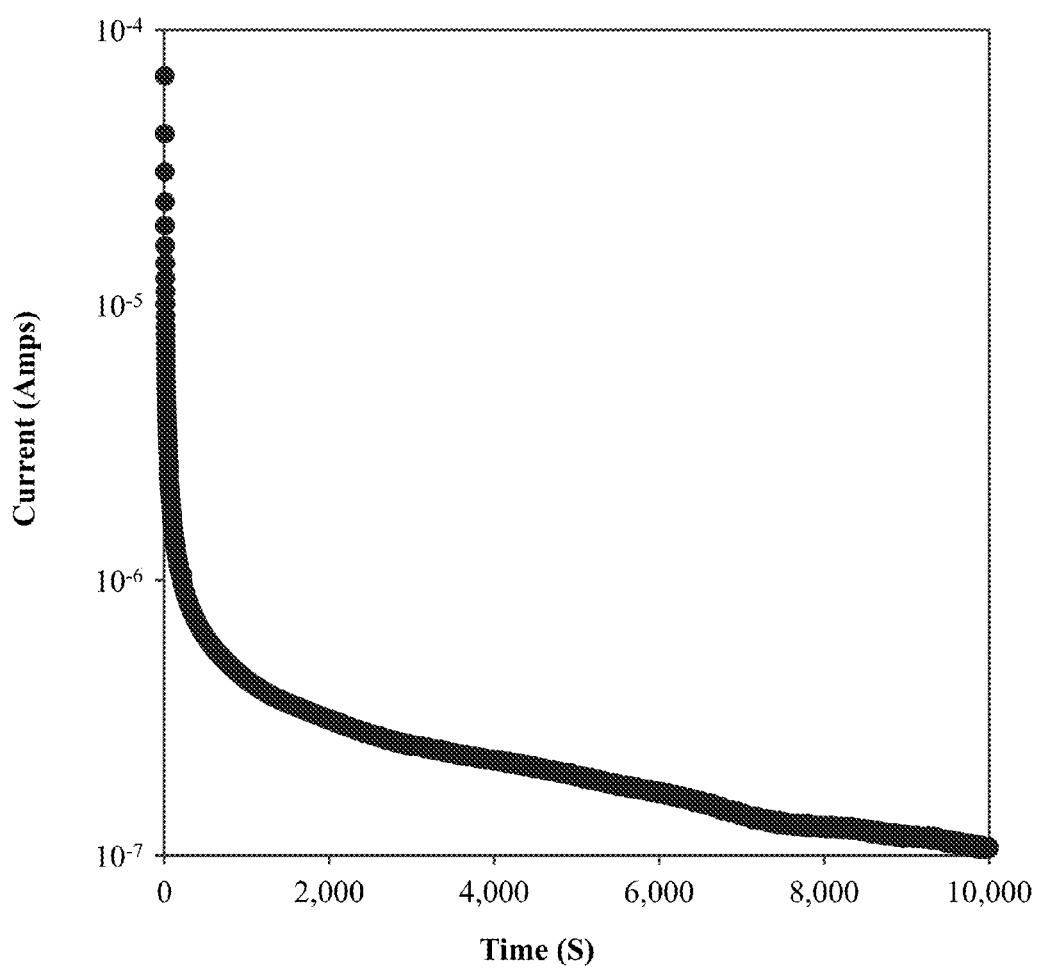
FIG. 3 is a DC polarization plot of cobalt doped NASICON.

The DC polarization plot of cobalt doped NASICON is shown in FIG. 3. A transference number greater than 0.999 was calculated for all doped and undoped NASICON samples confirming ionic mobility rather than electronic mobility. Ultimately comparing the sodium ion mobility between samples is achieved by analyzing the bulk conductivity of the NASICON samples.

Figure 4A:
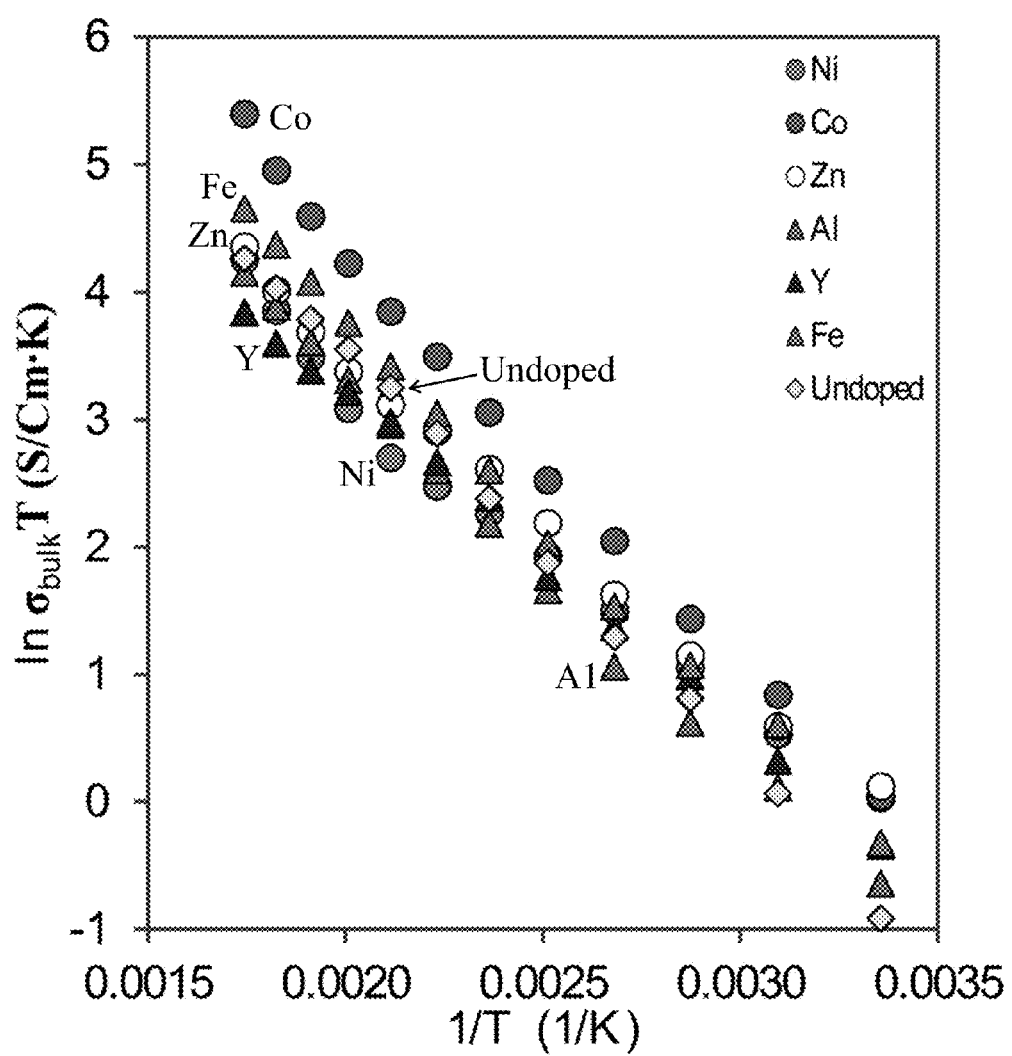
FIG. 4A shows an Arrhenius plot (conductivity versus 1/T) for the doped NASICON electrolytes.
Figure 4B:
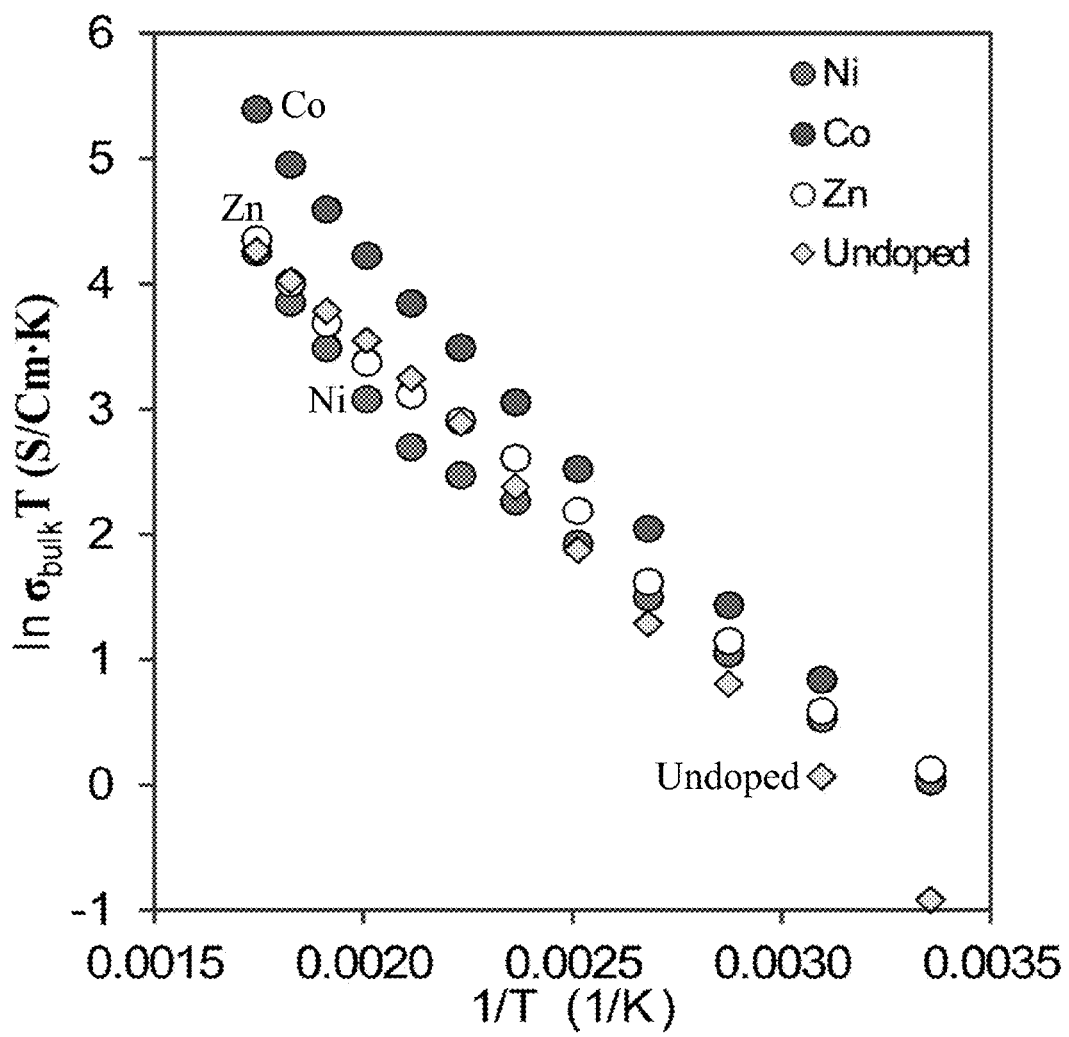
FIG. 4B shows an Arrhenius plot for +3 oxidation state doped NASICON electrolytes.
Figure 4C:
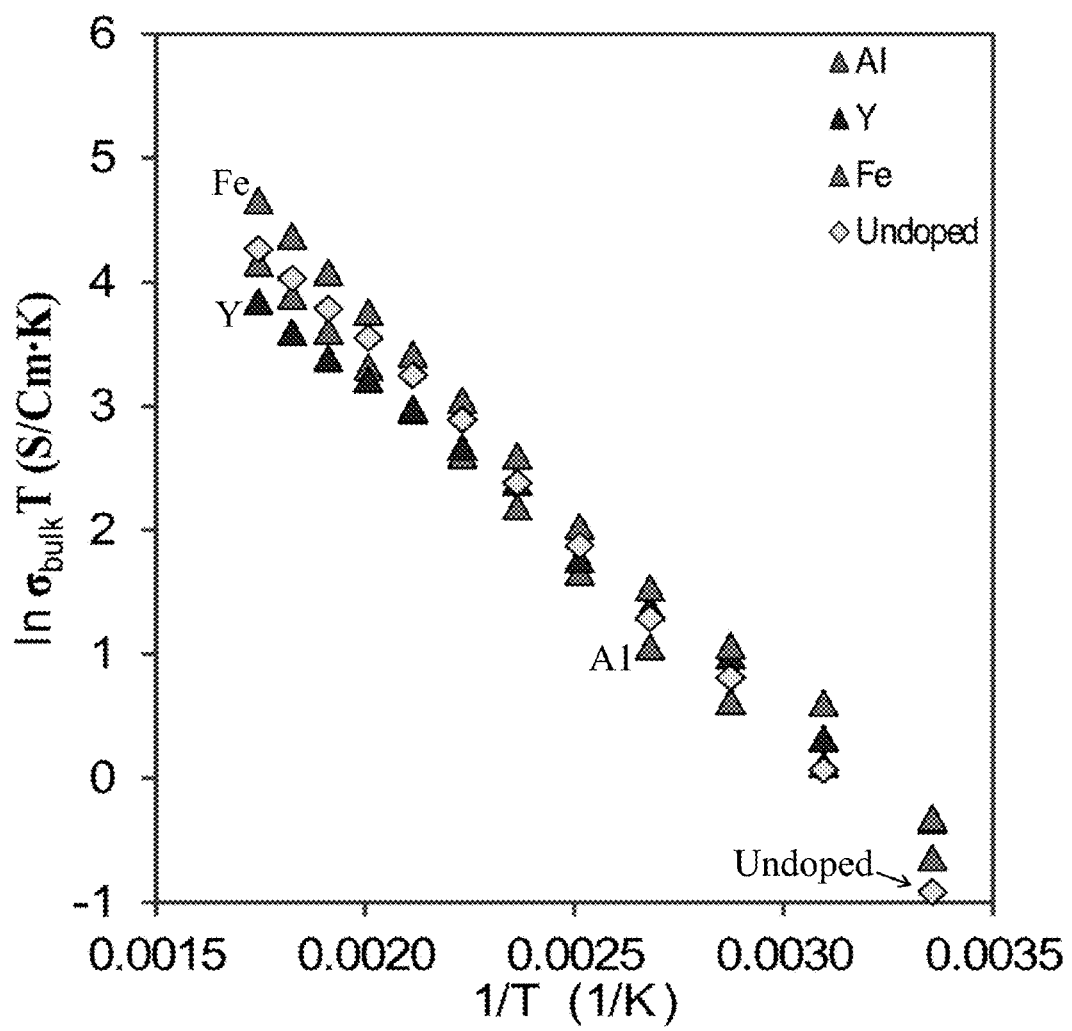
FIG. 4C shows an Arrhenius plot for +2 oxidation state doped NASICON samples.

The Arrhenius plots in FIG. 4A represent the bulk conductivity of the doped and undoped NASICON samples. The impedance results shown that all aliovalent doping investigated improved the bulk conductivity of NASICON at room temperature. Overall, the +2 oxidation state dopants resulted in a larger improvement of the bulk conductivity when compared to the +3 oxidation state dopants. At 300° C., cobalt doped NASICON exhibited the largest bulk conductivity improvement over based NASICON with almost a three-fold increase. At 25° C., zinc doped NASICON displayed a bulk conductivity of over three times that of undoped NASICON. The enhancement of +2 dopants on ionic conductivity at both high and low temperatures can be attributed to the change in activation energy. FIGS. 4B and 4C highlight the effect of the dopant oxidation state on activation energy and conductivity. Co, Ni, and Zn doped NASICON have a distinct high temperature and low temperature activation energy as well as higher room temperature conductivity compared to all the +3 dopants. In contrast, undoped NASICON and Al, Fe, and Y doped NASICON have a linear activation energy over the whole temperature range.

Aliovalent substitution increases Na+ conductivity in NASICON as a result of structural changes and an optimization of the chemistry. By doping the +4 zirconium site with lower valent cations, the sodium in the lattice be increased to compensate for the charge imbalance. An increase in sodium equates to an increase in charge carrier density. Thus an influx of mobile sodium ions in the conducting pathways would result in higher conductivity. The WDS analysis confirmed that NASICON doped with +2 oxidation state cations contained the most sodium in the bulk, and helps to explain why Co, Ni, and Zn doped NASICON exhibited higher conductivity than all of the other samples tested. Furthermore, aliovalent doping decreases the electrostatic interactions of the sodium ion with the zirconium site. A lower valent cation occupying the zirconium site would decrease the coulombic repulsion between the dopant ion and the sodium ion. With less electrostatic interactions on the sodium ion, it would take less energy for the ion to navigate the bottlenecks around the zirconium ions.

Figure 5:
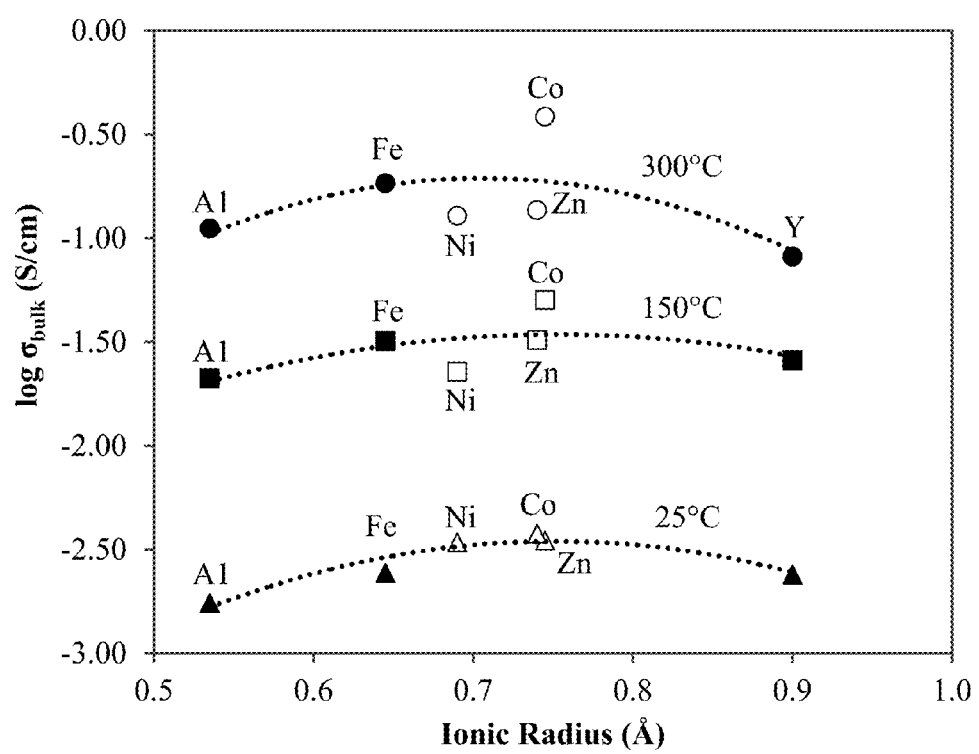
FIG. 5 is a graph of the bulk conductivity of doped NASICON electrolytes versus the ionic radius of the dopant. Circles represent conductivity at 300° C., squares represent conductivity at 150° C., and triangles represent conductivity at 25° C. Black shading represents +3 oxidation state dopants and white shading represents +2 oxidation state dopants.
Figure 6:
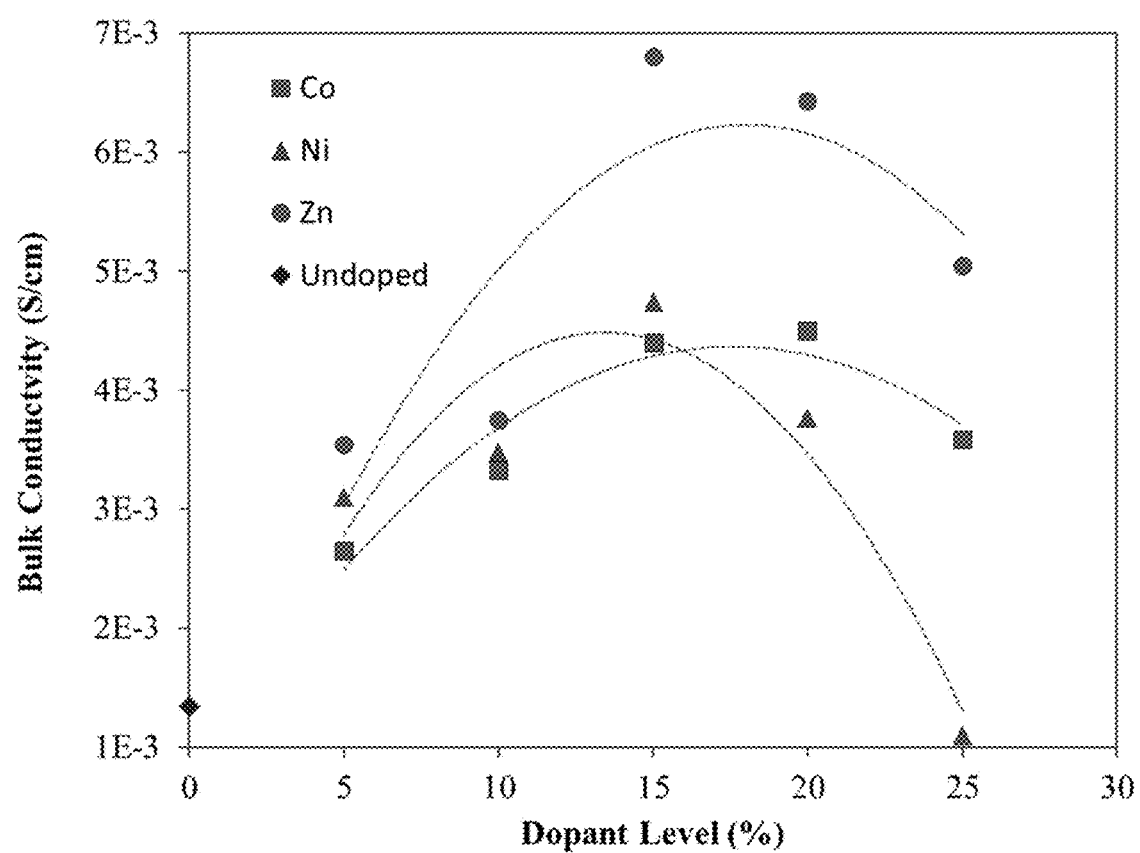
FIG. 6 shows a graph of the bulk conductivity of doped and undoped NASICON electrolytes versus dopant level at 25° C.

Although increased sodium in the lattice enhanced the conductivity, there was still variability in the bulk conductivity amongst the +3 and +2 valent doped NASICON. Thus, the ionic radius of the dopant, another critical variable affecting the structure, had a large impact on the conductivity of NASICON. Graphing the ionic radius of dopant versus bulk conductivity revealed that the optimum value of dopant radii is approximately 0.73 Å. In FIG. 5, the relationship between bulk conductivity of the doped NASICON samples and dopant ionic radius can be seen at a range of temperatures. Therefore, while the ionic radius of zirconium (0.72 Å) is an ideal size for the site, undoped $Na_3Zr_2Si_2PO_{12}$ does not have the advantage of increased sodium and charge imbalance at the Zr site that aliovalent substitution offers.

Therefore, increasing the amount of sodium in the NASICON structure through aliovalent doping the zirconium site enhances bulk conductivity. Increased sodium charge carriers in the lattice and a charge imbalance of the zirconium site related directly to improved ionic mobility. As a result, the low temperature activation energy was decreased for doped samples while their room temperature conductivity was increased. The conductivity was impacted by the ionic radius of the dopant as well, illustrating another important factor that effects the mobility of sodium ions. Ultimately aliovalent substitution of NASICON maximizes the conductivity when the dopant is +2 oxidation state cations and has an ionic radius of ~0.73 Å. As a results, Zn doped NASICON displayed the highest bulk conductivity at room temperature with $3.75 \times 10^{-3}$ S/cm. Nonetheless, Co doped NASICON exhibited the highest total conductivity at room temperature, $1.55 \times 10^{-3}$ S/cm, reinforcing that microstructure is still vital for manufacturing practical devices.

Having now fully described this invention, it will be understood by those of ordinary skill in the art that the same can be performed within a wide and equivalent range of conditions, formulations and other parameters without affecting the scope of the invention or any embodiment thereof.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

All patents and publications cited herein are fully incorporated by reference herein in their entirety.

What is claimed is:

1. A solid electrolyte of formula (I):

$$Na_{3+2x}M_xZr_{2-x}Si_2PO_{12} \qquad (I)$$

wherein
M is a metal ion selected from the group consisting of $Co^{2+}$, $Ni^{2+}$, and $Zn^{2+}$; and
x is between 0.1 and 1.5 when M is $Co^{2+}$ or $Ni^{2+}$ and x is between 0.5 and 1.5 when M is $Zn^{2+}$.

2. The solid electrolyte of claim 1, wherein x is between 0.1 and 1.2.
3. The solid electrolyte of claim 1, wherein x is between 0.1 and 0.3.
4. The solid electrolyte of claim 1, wherein x is 0.2.
5. The solid electrolyte of claim 1, wherein M is $Co^{2+}$.
6. The solid electrolyte of claim 1, wherein M is $Ni^{2+}$.
7. The solid electrolyte of claim 1, wherein M is $Zn^{2+}$.
8. The solid electrolyte of claim 1, wherein the solid electrolyte of formula (I) is selected from the group consisting of:
$Na_{3.4}Zr_{1.8}Co_{0.2}Si_2PO_{12}$; and
$Na_{3.4}Zr_{1.8}Ni_{0.2}Si_2PO_{12}$.
9. The solid electrolyte of claim 1, wherein the ionic conductivity at 25° C. is between 0.1 and 0.0001 S/cm.
10. The solid electrolyte of claim 1, wherein the ionic conductivity at 25° C. is between 0.1 and 0.001 S/cm.
11. A sodium ion battery comprising a solid electrolyte, wherein the solid electrolyte is of formula (I):

$$Na_{3+2x}M_xZr_{2-x}Si_2PO_{12} \qquad (I)$$

wherein
M is a metal ion selected from the group consisting of $Co^{2+}$, $Ni^{2+}$, and $Zn^{2+}$; and
x is between 0.1 and 1.5 when M is $Co^{2+}$ or $Ni^{2+}$ and x is between 0.5 and 1.5 when M is $Zn^{2+}$.

12. The sodium ion battery of claim 11, wherein the solid electrolyte of formula (I) is selected from the group consisting of:
$Na_{3.4}Zr_{1.8}Co_{0.2}Si_2PO_{12}$; and
$Na_{3.4}Zr_{1.8}Ni_{0.2}Si_2PO_{12}$.
13. The sodium ion battery of claim 11, wherein the solid electrolyte of formula (I) is $Na_{3.4}Zr_{1.8}Co_{0.2}Si_2PO_{12}$.
14. A method of producing the solid electrolyte of claim 1 comprising:
(a) ball milling a sodium source, a silicon source, a phosphate source, a zirconium source, and a dopant to produce a ball milled powder;
(b) calcining the ball milled powder to produce a calcined powder; and
(c) sintering the calcined powder to produce the solid electrolyte of claim 1, wherein the dopant is a cobalt source, a nickel source, or a zinc source.
15. The method of claim 14, wherein the sodium source is $Na_2CO_3$, the silicon source is $SiO_2$, the phosphate source is $Na_2HPO_4 \cdot 7H_2O$, and the zirconium source is $ZrO_2$.
16. The method of claim 14, wherein the dopant is selected from the group consisting of $Co(NO_3)_2 \cdot 6H_2O$, NiO, and ZnO.
17. The method of claim 14, wherein the ball milled powder is calcined at a temperature between 600° C. and 1200° C.
18. The method of claim 14, wherein the ball milled powder is calcined at a temperature between 600° C. and 1100° C.
19. The method of claim 14, wherein the calcined powder is sintered at a temperature between 900° C. and 1400° C.
20. The method of claim 14, wherein the calcined powder is sintered at a temperature between 1000° C. and 1300° C.

* * * * *